United States Patent
Van Steenwyk et al.

(10) Patent No.: US 11,766,944 B2
(45) Date of Patent: Sep. 26, 2023

(54) MUTLI-FUEL, RANGE EXTENDING POWER GENERATION PROPULSION SYSTEM, METHOD AND APPARATUS

(71) Applicant: American Power Group Corp., Chelmsford, MA (US)

(72) Inventors: Matthew D. Van Steenwyk, Las Vegas, NV (US); Kenneth Losch, Las Vegas, NV (US); Chuck Coppa, Chelmsford, MA (US); Lyle Jensen, Prole, IA (US); Mike Schiltz, Algona, IA (US); Don Wilkins, Geneva, IL (US)

(73) Assignee: American Power Group Corp., Chelmsford, MA (US)

( * ) Notice: Subject to any disclaimer, the term of this patent is extended or adjusted under 35 U.S.C. 154(b) by 160 days.

(21) Appl. No.: 17/513,706

(22) Filed: Oct. 28, 2021

(65) Prior Publication Data
US 2022/0144103 A1    May 12, 2022

Related U.S. Application Data

(60) Provisional application No. 63/113,110, filed on Nov. 12, 2020.

(51) Int. Cl.
| | |
|---|---|
| *B60L 50/62* | (2019.01) |
| *F02B 69/04* | (2006.01) |
| *B60L 50/10* | (2019.01) |
| *F02B 63/04* | (2006.01) |

(52) U.S. Cl.
CPC .............. *B60L 50/62* (2019.02); *B60L 50/10* (2019.02); *F02B 69/04* (2013.01); *F02B 63/04* (2013.01)

(58) Field of Classification Search
CPC .......... B60L 50/62; B60L 50/10; B60L 50/90; B60L 2270/12; F02B 69/04; F02B 63/04; Y02T 10/62; Y02T 10/70
See application file for complete search history.

(56) References Cited

U.S. PATENT DOCUMENTS

| | | | |
|---|---|---|---|
| 9,845,774 B2 * | 12/2017 | Gruschow | ........... F02D 41/0027 |
| 10,773,602 B2 | 9/2020 | Caliskan et al. | |
| 2011/0288738 A1 * | 11/2011 | Donnelly | ............ F02D 19/0647 |
| | | | 701/99 |
| 2018/0186361 A1 * | 7/2018 | Zhang | ..................... B60L 50/15 |
| 2020/0094690 A1 * | 3/2020 | Sondur | ................... B60L 1/003 |
| 2021/0129827 A1 * | 5/2021 | Light-Holets | ........... B60L 15/20 |

* cited by examiner

*Primary Examiner* — Grant Moubry
(74) *Attorney, Agent, or Firm* — Morse, Barnes-Brown & Pendleton, P.C.; Sean D. Detweiler, Esq.

(57) ABSTRACT

A system, method and apparatus for multi-fuel, range extending power generation applied to propulsion in a vehicle. One or more fluid fuels including diesel and natural gas and/or their renewable counterparts of Biodiesel or Renewable Natural Gas are stored on board a vehicle and selectively supplied to an onboard electrical generator according to sensor measurements analyzed by a processor directing power generation and transmission to motor controllers and motors providing vehicle propulsion. The combined natural gas-electric and diesel-electric transmissions control system power generation driving electric motors rather than a diesel engine mechanical connection to axles and wheels. This integrated system provides improved extended range to diesel hauling applications with improved emissions while maintaining torque, and efficiency.

8 Claims, 2 Drawing Sheets

MUTLI-FUEL, RANGE EXTENDING POWER GENERATION PROPULSION SYSTEM, METHOD AND APPARATUS

CROSS-REFERENCE TO RELATED APPLICATION(S)

This application claims priority to, and the benefit of, U.S. Provisional Application 63/113,110 filed Nov. 12, 2020, for all subject matter common to both applications. The disclosure of said provisional application is hereby incorporated by reference in its entirety.

FIELD OF THE INVENTION

The present invention relates to a system, method and apparatus for multi-fuel, range extending power generation applied to propulsion in a vehicle used for combined fuel-electric power production and transmission that efficiently powers a large vehicle in long haul applications by converting the mechanical force of the multi-fuel engine/generator into electrical energy (through a dynamo or alternator), and using the electrical energy to drive electric motors, which propel the vehicle mechanically. In particular, the present invention relates to a multi-fuel integrated system that provides extended range to transport and hauling applications through use of a combined diesel/natural gas engine driving a generator/regenerator that is alternatively supplying electrical power to a battery that drives electrical motors attached to the wheels, or alternatively drawing power from the wheels when the truck is slowing.

BACKGROUND

Many transportation companies are looking for a way to reduce their carbon footprint as a part of their overall Environmental, Social and Governance (ESG) initiatives or other Environmental, Health and Safety (EH&S) initiatives like ISO 14000, 14007 & 26000. Fossil derived diesel fuel has become very controversial due to its high carbon impact and yet it is the dominant transportation fuel globally. There are a number of alternatives to diesel: Natural Gas (Methane in Compressed or Liquid form), Propane, and even hydrogen along with their renewable counterparts: Landfill gas, Digester Gas (RNG: Renewable Natural Gas), Biodiesel and so on. The challenge with these fuels is that there is currently no distribution infrastructure and their costs, without government incentives, are prohibitive. These challenges make committing to them and investing in the fueling and vehicles very risky.

Generally, diesel engines, running on compression-ignited fuel, naturally run at much higher compression ratios, hence much greater efficiencies than other types of combustion engines (e.g. those that use spark plugs as a source of fuel/oxidizer ignition). Diesel engines also generate much greater horsepower than a spark ignited engine is able to generate at the same revolutions per minute (rpm). All Diesel engines have a "sweet spot," an rpm that generates 80% to 85% torque, and delivers the greatest efficiency. While currently used productively as an industry standard for long haul road transport (trucking), continued use of diesel fuel has a number of limitations and drawbacks. There are negative costs and negative externalities associated with diesel pollution as well as availability, refining, and transport of diesel fuel. This has led industries to seek alternatives to improve or replace current widescale use of diesel fuel. Several green or renewable energy alternatives are being considered.

Current thinking considering the alternative of electrification of the long haul over the road fleet (18 wheelers) imagines that soon a sufficient number of batteries of superior quality and performance will be able to be placed on board large hauling vehicles including 18 wheelers to make a meaningful impact in road mileage without impacting the load that a trucker can carry and the efficiency through which operations can be completed. This, however, is unlikely to be a realistic solution any time soon as battery technology has not developed the energy density or requisite design dimensions to be able to meet anything close to the demands for performance that would make adoption by industry possible. Similarly, adoption of fuel cell technology as an economically viable and operationally feasible long-haul power source are even farther away from realization, relying systems that are yet to exist, and fuel that isn't currently available in locations or quantities that could meet industry demands. In fact, when hydrogen is available, it usually is made from natural gas.

Unlike hydrogen, natural gas is an existing industrial scale fuel used in the relevant industries (e.g. in heating applications, forklift propulsion etc.). Natural gas is a readily available, clean burning alternative fuel that possesses several key advantages. Proposals have been made to adopt natural gas as the preferred long-haul fuel and replace diesel engines with natural gas engines. In the past, attempts were made to produce commercially feasible natural gas fueled engines, but the resulting torque and horsepower from these engines is much less than diesel counterparts, thus requiring bigger engines to drive the large wheels used in industry. Natural gas engines that finally were able to pull a standard long-haul truck were so large that they failed in the market. Others propose that natural gas engines instead be implemented as range extenders, wherein a vehicle would include a natural gas engine driving a generator that powers batteries that ultimately drive the wheels. Although this alternative resolves part of the problem of not enough torque at the wheels, natural-gas-engine-based range extenders operate at much lower compression ratios, hence efficiencies, and suffer from the "range anxiety" of only operating on natural gas, which though natural gas has an existing fuel supply infrastructure it is not a ubiquitous refueling option (such as diesel or gasoline fuels) for long range truck drivers, or any operator for that matter (and existing refueling infrastructure is not located for convenient use in long haul trucking). Alternative single fuel systems that are not mainstream, like natural gas, suffer from range anxiety. If one runs out of natural gas on a highway in the middle of a remote region, just pulling in anywhere to find a filling station with the appropriate fuel type is not possible. Range extending fuel options must be able to function for periods on existing widely available fuel options present along trucking routes (e.g. diesel or gasoline fuels) to eliminate range anxiety issues.

The range extender application is conceptually similar to principles used for some time in diesel-electric locomotives where the means by which mechanical power is conveyed to the driving wheels include diesel engines or generators used with diesel-electric transmissions that implemented a control system to control the internal combustion engine/generator creating electricity to power electric motors that in turn provided the mechanical power to propel the locomotive. Several issues must be overcome for this design including the problem of overloading and damaging traction motors with excessive electrical power at low speeds, and low power-to-weight ratios and narrow output range are more difficult to remedy in more confined spaces that provide stricter design restrictions.

There have been prior attempts at augmenting or modifying diesel-based engine designs to function using more than a single fuel that experience several problems associated with the differing combustion characteristics and resulting power from the different fuels, e.g. diesel fuel and natural gas, where either vehicle performance or engine design and configuration are compromised due to conflicting operating conditions. This is because the alternate fuel, e.g. natural gas, cannot maintain diesel characteristics driving axles and wheels or the design of the engine must be unnecessarily cumbersome to accommodate both fuel types. All vehicle engines must overcome the same problem: the engine needs to propel a vehicle from stand still to full velocity, resulting in the engine needing to operate through a wide variety of operating ranges, at various RPM's and supplying various amounts of power. Although efficiency can be improved, engines are still subject to this inherent inefficiency and fundamental operating limitation. Natural gas has inherent advantages as a fuel in both carbon footprint and emissions, but it still must operate through a wide range of RPM's and power demands, the same as for any engine. Combining the functions of the diesel engine with the functions of natural gas power units requires accommodating the RPM's and power demands somewhere between the two fuels with different chemical compositions and operating characteristics, and the result is that natural gas power units are often run at capacities that do not meet ideal operating characteristics, resulting in losses in power production and efficiency. Moreover, most prior engine designs accommodating use of multiple fuels are designed to use multiple fuels in series and at discrete time intervals without the capability to run multiple fuels simultaneously or activate augmentation or operation using a second fuel in real time during engine operation. Further, these designs require original incorporation or a complete engine compartment overhaul and cannot be made to work on the extensive number on existing vehicles such as trucks through e.g. retrofitting (or any diesel engine being used for power generation for that matter). Each of the individual existing technologies experiences multiple shortcomings.

SUMMARY

There is a need for a system, method and apparatus for multi-fuel, range extending power generation applied to propulsion in a vehicle multi-phase fluid conversion to output fuel and energy for providing customizable management for processing a volume of natural gas fuel in addition to a volume of diesel fuel that may be selectively conditioned, supplied, and combined into a variety of different products that more efficiently uses multiple different fuels possessing different positive attributes and operating characteristics within the same vehicle architecture to augment existing propulsion and/or generate electricity that drives electric motor propulsion units without ever over-processing those constituent fuels or inefficiently diverting or flaring off large quantities of those fuels, in order to fuel power generation applications in a responsive and dynamic manner that adapts to changing fuel demands and changing user input. The present invention is directed toward further solutions to address this need, in addition to having other desirable characteristics. Specifically, the present invention relates to a system and a method for managing variable, multi-fuel energy supply to vehicle components for providing customizable management for processing a volume of natural gas while still retaining the capability of selectively including vehicle processing of a volume of diesel fuel to create alternative fuel products to be used in the same set of engines and/or generators for combined and variable source power generation applications. One or more fluid fuels including diesel and natural gas are stored on board a vehicle and selectively supplied to an onboard engine/electrical generator according to sensor measurements analyzed by a processor directing power generation and transmission to motor controllers and motors providing vehicle propulsion. Dual fuel diesel-based engine applications have been well documented. The combined natural gas-electric and diesel-electric transmissions use these fossil fuels to generate electric power for electric motors that provide vehicle propulsion, rather than a diesel engine mechanical connection to axles and/or wheels via conventional transmission. Introducing natural gas with the APG system allows the diesel engine to continue to operate at that same great efficiency and torque. All engines have a "sweet spot," an rpm that generates 80% to 85% torque, and delivers the greatest efficiency, and this is unchanged operating on the multi-fuel system. Appending a generator such that the dual fuel or multi-fuel engine can be run at a constant RPM is what maximizes efficiency from the engine at any time it is running, with a maximum substitution rate of clean burning natural gas any time the system is in active operation. Therefore, during this operation, there are greatly reduced emissions and carbon footprint, greater than one would get from either a natural gas engine of the same size, or a diesel engine driving the same size vehicle, or from a dual fuel engine driving the propulsion wheels directly. In particular, the method, system and apparatus provide for automated feedback and control directing various fuel constituents to supply the engines/generators with fuel at different periods with differing allocations according to settings, sensor measurements, system parameters or predetermined operating profiles to quickly and efficiently meet demand for various vehicle output under dynamic hauling and transport conditions while making adjustments in real time using a multi-fuel engine driving a generator/regenerator that is alternatively supplying electrical power to a battery that drives electrical motors attached to the wheels. The method, system and apparatus of the present invention automatically adjusts to varying inputs—rerouting fuel supply and products (e.g. generated electricity) based on need, operating conditions and input composition. In this way the system keeps operating despite a switch in the type of fuel being processed to provide electrical power generation capabilities and the system, subsystems and components do not have to delay or shut off to perform a transition from use of one type of fuel to an alternative fuel type when input, demand or operating characteristics dictate a different fuel profile is preferable or if operating parameters exceeded. Processors, control components and motor controls merely adjust system flows to the correct configuration and continue processing and producing electricity from the currently selected fuel type to power electric motors driving vehicle propulsion. It therefore continues to provide products, e.g. it provides immediate power, including to power to vehicle systems including lighting, onboard computing and communication and auxiliary electrical components (e.g. sensors, climate controls, displays or warning indicators, etc.), without reductions in operational capacity, keeping certain components operating within parameters, continuing power to be transmitted and products to be delivered. The combined solution incorporating a flexible, variable system with a multi-fuel engine/generator may use a variety of fuels including diesel fuels and natural gas fuels, not as a direct, mechanically linked drive of the vehicle wheels, but as a range extender, and is thus a unique embodiment of multi-fuel and range extender architectures and capabilities suitable for improved efficiency and emissions in heavy load and long-haul carrying applications as well as other vehicle transport applications. The inventive system and method increase the range of the vehicle, by operating at constant output ratios from the different fuel types while accommodating the particular demands of each particular trip (where starting and stopping would require a greater percentage of use of the diesel fuel input capabilities in low rpm and low speed, high torque, situations, or where long uninterrupted and downhill intervals of travel would allow for a greater percentage of use of natural gas fuel) or alternatively drawing power from the wheels when the truck is slowing using regenerative or dynamic braking. In example embodiments, more or less flow can be directly used a set of engines/generators/regenerators; more or less flow can be allocated to various subprocesses; more or less flow can be diverted or combined using conduits or wastegates or transported for external exhaust. This system and method can also easily be adapted to function on existing trucks or other vehicles by retrofitting. Power supply and/or flow demand do not suffer bottlenecks or reduced capacity during transitions between fuel types being operated by the system.

In accordance with aspects of the present invention, the system, method and apparatus for multi-fuel, range extending power generation applied to propulsion in a vehicle controls, inter alia, the flow rate and constituent ratio of all fuels supplied to subsystems and products thereof to convert diesel and/or natural gas into electricity applied to electric motors by selectively receiving and processing a volume of diesel fuel or natural gas in various vehicle subsystems including engines/generators. The volume of one or more fluid fuels including diesel and natural gas is stored on board a vehicle and selectively supplied to an onboard electrical generator according to sensor measurements analyzed by a processor directing power generation and transmission to motor controllers and motors providing vehicle propulsion. The combined natural gas-electric and diesel-electric transmissions control system power generation drive electric motors rather than a diesel engine mechanical connection to axles and wheels. This integrated system provides improved, extended range to diesel hauling applications with improved emissions while maintaining torque, and efficiency that a diesel-only system may provide under comparable conditions. The integrated system and method further provide the advantage of dual fuel applications (e.g. dual fuel or multi-fuel range extender) wherein if a vehicle runs out of natural gas in the middle of a remote region lacking certain refueling infrastructure, the system automatically is able to run on 100% diesel until a location is found to refuel the natural gas in the vehicle.

The inventive system provides: 1) higher efficiency from operating a compression ignited engine; 2) the ability to operate that engine at an optimum power setting any time it is on, thus getting optimum efficiency any time the engine is on; 3) the ability to substitute or supplement natural gas for diesel fuel at optimum running conditions, any time the engine is on, thus optimizing costs, pollution (emissions) and carbon footprint; 4) reduced wear and tear on the engine because it is not constantly cycling, needing to power the vehicle (e.g. truck) from a standstill to full velocity; 5) extended range for a given engine configuration without sacrificing torque or efficiencies thereby mitigating range anxiety while operating between fuel sources and 6) the ability to downsize the engine for any given weight class vehicle because it is a power supply driving a generator that is charging an energy storage component (such as a battery) that operates both as a surge power supply and constant power supply to the vehicles electric motors.

Example embodiments of the present invention provide a multi-fuel, range extending power generation propulsion system that includes a processor disposed in a vehicle that is in electronic communication with a diesel fuel supply subsystem and a natural gas fuel supply subsystem, wherein the processor instructs one or more control components configured for selecting between based on measurements obtained from one or more sensors and preprogrammed range and torque logic. The diesel fuel supply subsystem and the natural gas fuel supply subsystem are in selective fluid communication with at least one engine or generator, based on selections made by the processor. The at least one generator is configured to compress a fluid fuel including diesel fuel or natural gas to create combustion used to generate electricity by actuating a dynamo or alternator in electrical communication with a rectifier and/or inverter, then transmit electrical power comprising voltage and current to one or more energy storage components or one or more motor controllers. The one or more motor controllers in electronic communication with, and receiving electrical voltage and current from, the at least one generator or the one or more energy storage components, are configured to control operation of one or more electric motors configured to propel a vehicle in response to instruction from the processor or input from user controls.

In certain aspects, the one or more energy storage components are batteries or other capacitive devices.

In some aspects, the diesel fuel comprises bio-diesel fuel and/or the natural gas comprises Renewable natural gas.

In certain aspects, additional electrical power is provided by a regenerative or dynamic braking using the one or more electric motors.

In accordance with example embodiments of the present invention, a multi-fuel, range extending power generation method includes a processor selecting between a diesel fuel supply subsystem and a natural gas fuel supply subsystem based on measurements obtained from one or more sensors and preprogrammed range and torque logic, with the diesel fuel supply subsystem or the natural gas fuel supply subsystem supplying fluid fuel to at least one generator, based on selections made by the processor. The method operates the at least one generator compressing the fluid fuel to create combustion used to generate electricity by actuating a dynamo or alternator in electrical communication with a rectifier or inverter, transmitting electrical power comprising voltage and current to one or more batteries or one or more motor controllers. The method implements the one or more motor controllers in electronic communication with, and receiving electrical voltage and current from, the at least one generator or the one or more batteries, and controls operation of one or more electric motors configured to propel a vehicle in response to instruction from the processor or input from user controls.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a system, method and apparatus for multi-fuel, range extending power generation applied to propulsion in a vehicle. One or more fluid fuels including diesel and natural gas (in gaseous or compressed/condensed liquid state) are stored on board a vehicle and selectively supplied to an onboard engine/electrical generator according to sensor measurements analyzed by a processor directing power generation and transmission to motor controllers and motors providing vehicle propulsion. The combined natural gas-electric and diesel-electric transmissions control system power generation driving electric motors rather than a diesel engine mechanical connection to axles and wheels. This integrated system provides improved extended range to diesel hauling applications with improved emissions while maintaining torque, and efficiency typically provided by diesel-only configurations. Various example implementations are provided herein, but do not limit the scope of the present invention, which is intended to relate to implementations including dual fuel engines that drive a transmission that drives a generator that drives an electric motor that drives vehicle wheels, or dual fuel engines that drive a generator directly that drives an electric motor that drives vehicle wheels, and/or dual fuel engines that drive a generator that drives an electric motor that drives vehicle wheels through a transmission. In all of these implementations, the electric motor can be supplemented by, or have primary power supplied by, energy storage components, such as electric batteries or other capacitive devices. It should also be understood that the diesel fuel can include Biodiesel and the natural can include methane (in compressed or liquid form), Propane, and even hydrogen along with their renewable counterparts: Landfill gas, Digester Gas (RNG: Renewable Natural Gas).

As an alternative, or even a path forward, this present invention allows the use of a combination of these fuels so that the consumer can select the optimal cost vs emissions combination based upon what fuels are available in each market without the risk of committing to just one. Through the application of a multi-fuel prime mover, users have the opportunity to select the fuel combination with the lowest cost and/or environmental impact.

Figure 1:
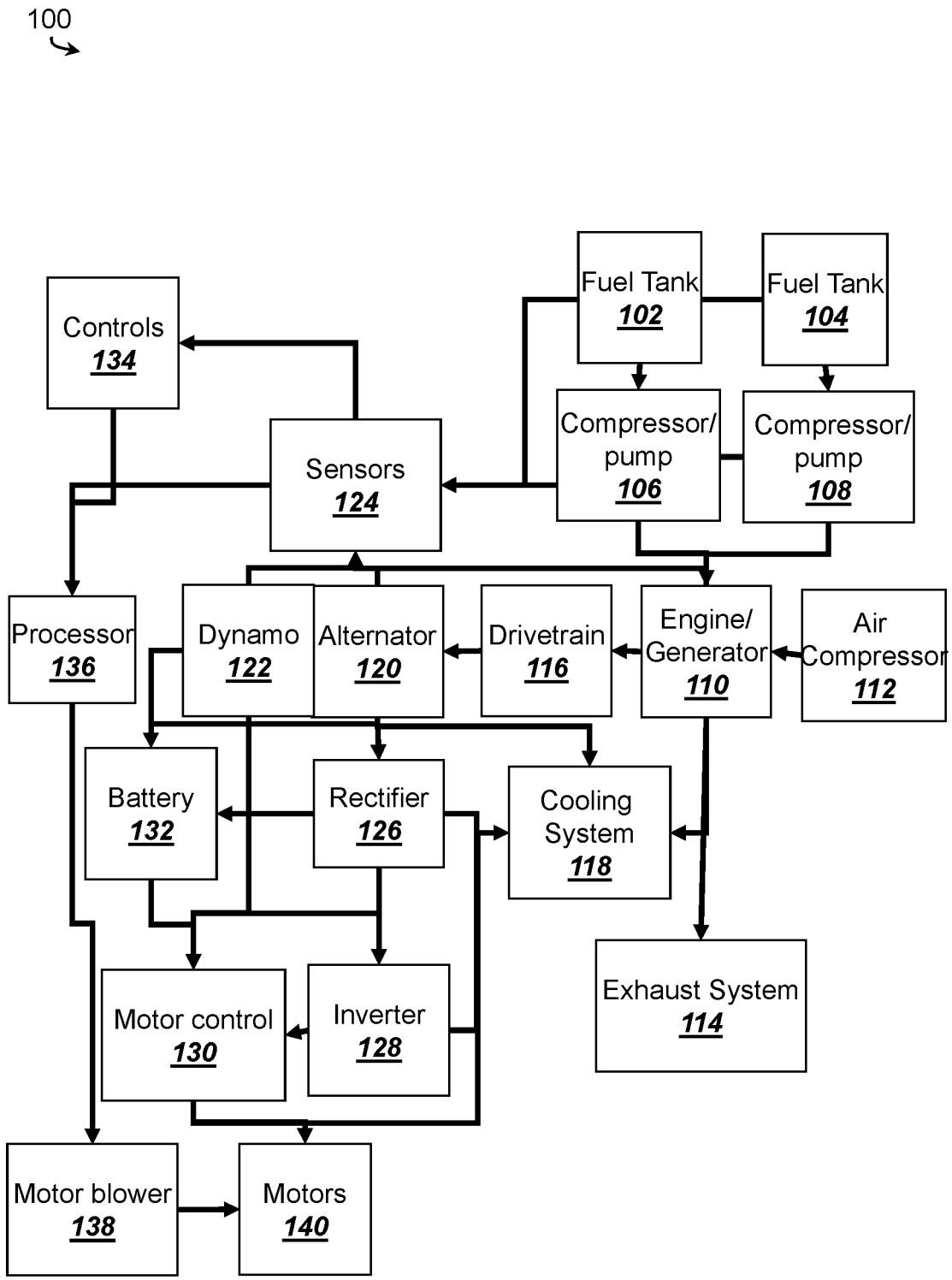
FIG. 1 is a diagrammatic illustrative example of a system for implementation of the present invention.
Figure 2:
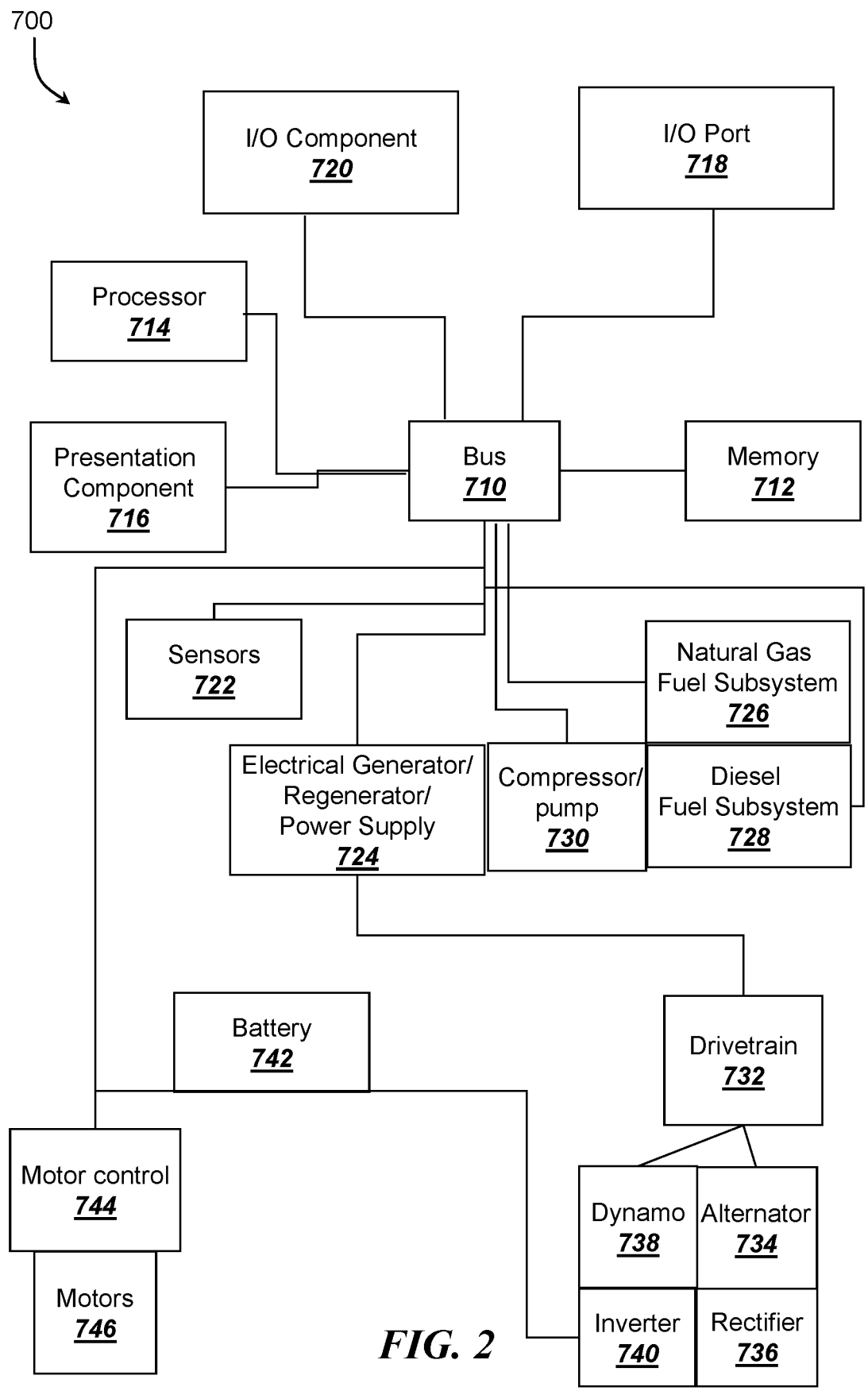
FIG. 2 is a diagrammatic illustration of a high-level architecture for implementing processes in accordance with aspects of the invention.

FIGS. 1 through 2, wherein like parts are designated by like reference numerals throughout, illustrate an example embodiment or embodiments of a multi-fuel, range extending power generation and vehicle propulsion system, method and apparatus, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts a diagram of an example embodiment of the present invention. The method, system and apparatus for managing variable, multi-phase on-site electric power and fluid conversion to output fuel and energy for providing customizable management for processing and supplying either diesel-based or natural-gas-based fuels within a single, switchable and fully integrated vehicle architecture. In particular, the method, system and apparatus provide for automated feedback and control, directing fuels including diesel fuel and natural gas to be used in clean fuel vehicles, according to settings or system 100 parameters to quickly and efficiently meet demand for various operating characteristics and parameters while making adjustments in real time.

In an example embodiment a combined multi-fuel engine/generator 110 architecture uses a single integrated and variable system 100 comprising one or more engines 110 capable of selectively operating as both a diesel engine and a natural gas engine using the same components to drive (via drivetrain 116) either an electrical DC generator/dynamo 122 or an electrical AC alternator 120 with rectifier 126, where both may be in direct electrical communication with an inverter 128, used to meet various electrical demands and applications within the vehicle. The electric power generation subsystem provides electric power in the form of electric voltage and current to one or more motor controllers 130 and/or energy storage component 132, such as batteries or other capacitive devices (that store and subsequently provide that stored energy to the one or more motor controllers 130) that power one or more electric motors 140 (e.g., traction motors) that provide mechanical power to propel the vehicle, e.g., by rotating wheels and axles. The electric voltage and current generated also power auxiliary devices including sensors 124, controls 134, processor 136, as well as vehicle lighting, displays, and other common electrical components, and may even be used to power components of the engine 110 or motor blower 138 when such components are electrically (as opposed to directly mechanically) driven. There is no mechanical connection between the combined natural gas/diesel engine 110 and the wheels. Drivetrain 116 components and elements including drive shafts, chain drives, fluid couplings, transfer case, differential, torque converter, and/or axles are connected to the electrical motors 140 to transmit mechanical power to propel the vehicle, such as by rotating axles and wheels. Maintaining acceptable operating parameters requires complex control systems. The power output may be primarily determined by its rotational speed (RPM) and fuel rate, which are regulated by a processor 136 and motor controllers 130 or a governor or similar mechanism. The processor 136 or governor are designed to react to both the throttle setting, as determined by the engine 110 driver and the speed at which the individual components are running. The engine/generator mechanically connected to a dynamo 122 or alternator 120 comprises one or more field components, generating electrical voltage and current. The field components comprise field winding/coils or field magnets and further comprise at least one rotor and at least one stator that surrounds the rotor, each generating a magnetic field or having a wire winding in which a changing field induces an electric current, which provides power to a circuit applying generated electrical voltage and current. Components in electrical communication with the electricity generation subsystem (e.g., sensors 124) are connected using one or more electrical circuits comprising wires or circuit pathways including electrical conduits, junctions and connectors or sockets. Like a diesel-electric transmission, or diesel-electric powertrain (sometimes termed electric transmission), the multi-fuel-electric transmission components are configured such that electric motors 140 are able to supply full torque at 0 RPM. A defining characteristic of such fuel-electric transmissions is that it avoids the need for a gearbox, by converting the mechanical force of the engine 110 into electrical energy (through a dynamo 122 or alternator 120), and using the electrical energy to drive electric motors 140, which propel the vehicle mechanically. The electric motors 140 may be powered directly or via rechargeable energy storage components 132 (such as batteries or other capacitive devices), making the vehicle a type of hybrid electric vehicle.

To fuel the electric power generation subsystem, a combined energy source in the form of two or more fluid fuels (diesel or natural gas) is implemented wherein a fluid fuel supply subsystem including a fuel tank, regulators and supply lines is provided for each fuel type in parallel (thus a diesel fuel supply subsystem and a natural gas supply subsystem co-exist and operate simultaneously or alternatively based on processor control). In an embodiment where the system 100 includes a diesel fuel supply subsystem and a natural gas supply subsystem working cooperatively, the diesel fuel supply subsystem a dedicated fuel tank 102 with fuel compressor or pumps 106 as required, and a natural gas supply subsystem dedicated fuel tank 104 with fuel compressor or pumps 108 as required (where additional compressors, condensers, or pumps may be implemented to maintain appropriate pressures when natural gas is supplied in liquid form comprising one or more pumps 108, transporting fuel to a liquefier or compressor converting it to LNG then transporting LNG to fuel tank 104). Each separate, parallel fuel tank 102, 104 may comprise on or more of insulated tanks, compressed gas tanks cryogenic tanks in fluid communication with the fluid supply subsystem that further comprises pipes or fluid conduits and junctions connecting the engine/generator 110 and the fluid supply subsystem. Adjusting pressure of the supplied diesel fuel or natural gas fuel is accomplished by the compressor or pumps 106, 108 in fluid communication with the engine/generator 110 using one or more pipes or fluid conduits controlling respective flows, transporting diesel fuel or natural gas fuel from one or more storage vessels or fuel tanks. Each fuel supply subsystem may further comprise a charging line configured to fill a fuel tank 102, 104 of a clean fuel vehicle with diesel fuel or natural gas fuel respectively, to a selected amount according to relative fuel demands.

Additionally supply of an oxidizer (e.g. air, stored oxygen) to the engine/generator 110 a compressor subsystem to enable combustion may be accomplished using one or more engine 110 air compressors 112, turbochargers 112, or pumping components 112 that are in fluid communication with an oxidizer inlet or source and are disposed within pipes or fluid conduits of one or more of: the fluid supply subsystem, a fluid conditioning subsystem, the exhaust and temperature control subsystem, the electrical generation (and product) subsystem, or the monitoring and control subsystem.

The exhaust subsystem 114, and cooling subsystem 118 employ components comprising one or more of a heat exchanger, radiator, pipes or fluid conduits, junctions and vents managing fuel safety, where volatile gases may be passed through one or more vent connections to be vented to the exterior environment that may also function as heat exchangers in a thermal energy transfer interface environment to maintain the fuel or working fluids and components at the proper temperature and state to efficiently fuel the power generation subsystem. Each fuel may be adjusted by additional means comprising one or more dedicated heat exchangers. In embodiments using a condensed liquid stream, a vaporizing apparatus configured to receive the condensed liquid and convert the condensed liquid to gaseous form prior to entering the power generation subsystem or gas supply transported by the pipes or fluid conduits using a valve subsystem including e.g. a sensor and port, a level sensor feed through, pressure transmitters, level sensors, coolant circulation pumps, and pressure regulators solenoid valves, used to monitor, direct, reroute, and adjust the flow of fuel, exhaust and coolant through the relevant conduits in the proper manner to supply the power generation subsystem, remove exhaust and manage waste heat.

A monitoring and control subsystem informs the processor 136 of various vehicle operating conditions and comprises sensors 124 including one or more regulators or pressure regulators, one or more safety valves or pressure safety valves, one or more connectors or pipes or fluid conduits, junctions with the fluid supply subsystem, pressure sensors, pressure gauges, one or more pressure build units, electrical wiring and electrical circuits or connections, and logic instructing one or more control units directing and adjusting diesel fuel or natural gas fuel flow or dedicated fuel supply subsystems based on measurements by at least one measurement component or one or more sensors, in real time using valves and components to meet one or more of: flow demand, user input, predetermined operating parameters, thresholds or system specifications.

The monitoring and control subsystem operates a computer processor 136, memory 712, electronic communications network, control signals and an application and/or control logic that automatically controls flow adjusting composition of the diesel fuel, natural gas fuel, oxidizer and exhaust gas selectably and directs fluids in real time using valves and components to meet one or more of: flow demand, predetermined thresholds, predetermined specifications, and predetermined system parameters, by performing one or more of: increasing or decreasing flow of input natural gas or diesel fuel from the fluid supply subsystem to the engine/generator 110; increasing or decreasing electrical voltage or current from the electricity generation subsystem to the motor controllers 130 and motor 140.

Motor 140 performance may be controlled either by varying the DC voltage output of the main generator 110, for DC motors 140, or by varying the frequency and voltage output for AC motors 140. With DC motors 140, various connection combinations are utilized to adapt the drive to varying operating conditions. These transitions may include series/parallel or "motor transitions" where initially, pairs of motors are connected in series across the main generator. At higher velocity, motors are reconnected in parallel across the main generator. Other transition types include "Field shunting", "field diverting", or "weak fielding." Resistance is connected in parallel with the motor field. This has the effect of increasing the armature current, producing a corresponding increase in motor torque and rotational velocity. Both methods may also be combined, to increase the operating velocity range. Certain systems may also implement generator/rectifier transitions reconnecting two separate internal main generator stator windings of two rectifiers from parallel to series to increase the output voltage.

In operation, power output, and thus velocity, is typically controlled by the engine 110 driver using a throttle that produces binary-like electrical signals corresponding to throttle position. This basic design produces scalable, repeatable discrete conditions that assure that all units and individual components needed for successful operation respond in the same consistent way to throttle position. Binary encoding also helps to minimize the number of electrical connections that are required to pass signals from unit to unit. When the throttle is in the idle position, the prime mover will be receiving minimal fuel, causing it to idle at low RPM. In addition, the electric motors will not be connected to the main generator and the generator's field windings will not be excited (energized), so the generator 110 will not produce electricity with no excitation, conceptually similar to placing an automobile's transmission into neutral while the engine is running. Moving the throttle into the first operative power position will cause the electric motors to be connected to the main generator and the latter's field coils to be excited. With excitation applied, the main generator will deliver electricity to the electric motors. The propulsion system is designed to produce maximum motor torque at start-up and the control system is designed so that the main generator electrical power output is matched to any given engine speed. Given the innate characteristics of traction motors, as well as the way in which the motors are connected to the main generator, the generator will produce high current and low voltage at low speeds, gradually changing to low current and high voltage as the vehicle accelerates. As the load on the engine changes, its rotational speed will also change. This is detected by the governor through a change in the engine speed feedback signal. The net effect is to adjust both the fuel rate and the load regulator position so that engine RPM and torque (and thus power output) will remain constant for any given throttle setting, regardless of actual road speed. Being controlled by a processor, each engine speed step is allotted an appropriate power output, or "kW reference", in software. The computer compares this value with actual main generator power output, or "kW feedback", calculated from electric motor current and main generator voltage feedback values. The processor adjusts the feedback to match the reference value by controlling the excitation of the main generator. Systems may be fitted with electronic fuel injection (EFI) and may have no mechanical governor; however, a "virtual" load regulator and governor are retained with computer modules.

An additional alternative available in diesel-electric and other electric vehicle systems that rotate wheels with motors is the use of regenerative or dynamic (rheostatic) braking. Regenerative or dynamic braking takes advantage of the fact that electric motor (e.g. traction motor) armatures are always rotating when the vehicle is in motion and that a motor can be made to act as a generator by separately exciting the field winding. When dynamic braking is utilized, the traction control circuits are such that each traction motor is connected through an inverter back to the energy storage components (batteries) to cause them to generate electricity and provide braking or rolling resistance (e.g. dynamic braking). The motors provide drag and act as a brake. As speed decreases, the braking effect decays and usually becomes ineffective below approximately 16 km/h (10 mph), depending on the gear ratio between motors and axles. At very low speeds and in emergency situations, traditional friction brakes provide the additional stopping power that is requested by the operator.

FIG. 2 depicts any suitable computing device 700 that can be used to implement the computing/user/vehicle devices, or the system 100 disposed within and integrated into a vehicle hosting the multi-fuel range extending architecture, and methods/functionality described herein and be converted to a specific system 100 for performing the operations and features described herein through modification of hardware, software, and firmware, in a manner significantly more than mere execution of software on a generic computing device 700, as would be appreciated by those of skill in the art. One illustrative example of such a computing device 700 may incorporate the processor 714, 136 depicted in FIG. 1. The computing device 700 is merely an illustrative example of a suitable computing environment and in no way limits the scope of the present invention. A "computing device," as represented by FIG. 2, can include a "vehicle computing unit," an "onboard computer," "automobile computer systems," "workstation," a "server," a "laptop," a "mobile device," a "tablet computer," or other computing devices 700, as would be understood by those of skill in the art. Given that the computing device 700 is depicted for illustrative purposes, embodiments of the present invention may utilize any number of computing devices 700 in any number of different ways to implement a single embodiment of the present invention. Accordingly, embodiments of the present invention are not limited to a single computing device 700, as would be appreciated by one with skill in the art, nor are they limited to a single type of implementation or configuration of the example computing device 700.

The system includes a computing device 700 can include a bus 710 that can be coupled to one or more of the following illustrative components, directly or indirectly: a memory 712, one or more processors 714, one or more presentation components 716, input/output ports 718, input/output components 720, and a power supply that may comprise one or more units and may take the form of the generator 724, a regenerator, or even a battery 742 that may be in electronic communication with one or more components including the bus 710. One of skill in the art will appreciate that the bus 710 can include one or more busses, such as an address bus, a data bus, or any combination thereof. This bus 710 can electrically connects components of the multi-fuel, range extending power generation propulsion system, including a natural gas fuel subsystem 726, natural gas fuel subsystem 728, compressors and/or pumps 730, engine/generator/regenerator/power supply 724, drive train 732, alternator 734, dynamo 738, rectifier 736, inverter 740, sensors 722, motor controllers 744, batteries 742, processor 714, and motors 746. One of skill in the art additionally will appreciate that, depending on the intended applications and uses of a particular embodiment, multiple of these components can be implemented by a single device. Similarly, in some instances, a single component can be implemented by multiple devices. As such, FIG. 2 is merely illustrative of an exemplary computing device that can be used to implement one or more embodiments of the present invention, and in no way limits the invention.

The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage (aka, storage system) or other magnetic storage devices that can be used to encode information and can be accessed by the computing device 700.

The memory 712 can include computer-storage media in the form of volatile and/or nonvolatile memory. The memory 712 may be removable, non-removable, or any combination thereof. Exemplary hardware devices are devices such as hard drives, solid-state memory, optical-disc drives, and the like. The computing device 700 can include one or more processors 136 that read data from components such as the memory 712, the various I/O components 716, etc. Presentation component(s) 716 present data indications to a user or other device. Exemplary presentation components include a display device, speaker, printing component, vibrating component, etc.

The I/O ports 718 can enable the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A multi-fuel, range extending power generation propulsion system, comprising:
   a processor disposed in a vehicle and in electronic communication with a diesel fuel supply subsystem and a natural gas fuel supply subsystem, wherein the processor instructs one or more control components configured for selecting between based on measurements obtained from one or more sensors and preprogrammed range and torque logic;
   the diesel fuel supply subsystem and the natural gas fuel supply subsystem in selective fluid communication with at least one generator, based on selections made by the processor;
   the at least one generator configured to compress a fluid fuel comprising diesel fuel or natural gas to create combustion used to generate electricity by actuating a dynamo or alternator in electrical communication with a rectifier or inverter, then transmit electrical power comprising voltage and current to one or more energy storage components or one or more motor controllers; and
   the one or more motor controllers in electronic communication with, and receiving electrical voltage and current from, the at least one generator or the one or more energy storage components, and configured to control operation of one or more electric motors configured to propel a vehicle in response to instruction from the processor or input from user controls.

2. The system of claim 1, wherein the energy storage components comprise batteries or capacitive devices.

3. The system of claim 1, wherein the diesel fuel comprises bio-diesel fuel and/or the natural gas comprises Renewable natural gas.

4. The system of claim 1, wherein additional electrical power is provided by a regenerative or dynamic braking using the one or more electric motors.

5. A multi-fuel, range extending power generation method, the method comprising:
   a processor selecting between a diesel fuel supply subsystem and a natural gas fuel supply subsystem based on measurements obtained from one or more sensors and preprogrammed range and torque logic;
   the diesel fuel supply subsystem or the natural gas fuel supply subsystem supplying fluid fuel to at least one generator, based on selections made by the processor;
   the at least one generator compressing the fluid fuel to create combustion used to generate electricity by actuating a dynamo or alternator in electrical communication with a rectifier or inverter, then transmitting electrical power comprising voltage and current to one or more energy storage components or one or more motor controllers; and
   the one or more motor controllers in electronic communication with, and receiving electrical voltage and current from, the at least one generator or the one or more energy storage devices, and controlling operation of one or more electric motors configured to propel a vehicle in response to instruction from the processor or input from user controls.

6. The method of claim 5, wherein the energy storage components comprise batteries or capacitive devices.

7. The method of claim 5, wherein the diesel fuel comprises bio-diesel fuel and/or the natural gas comprises Renewable natural gas.

8. The method of claim 5, wherein additional electrical power is provided by a regenerative or dynamic braking using the one or more electric motors.

\* \* \* \* \*

UNITED STATES PATENT AND TRADEMARK OFFICE
CERTIFICATE OF CORRECTION

| | |
|---|---|
| PATENT NO. | : 11,766,944 B2 |
| APPLICATION NO. | : 17/513706 |
| DATED | : September 26, 2023 |
| INVENTOR(S) | : Matthew D. Van Steenwyk et al. |

It is certified that error appears in the above-identified patent and that said Letters Patent is hereby corrected as shown below:

On the Title Page

In the Title and in the Specification, Column 1, Line 1:
Delete, "MUTLI-FUEL" and insert --MULTI-FUEL--.

Signed and Sealed this
Twenty-third Day of January, 2024

Katherine Kelly Vidal
*Director of the United States Patent and Trademark Office*